United States Patent [19]
Broadbent

[11] Patent Number: 5,884,642
[45] Date of Patent: Mar. 23, 1999

[54] REMOTELY CONTROLLED PRESSURIZED LIQUID DISPENSING MOBILE UNIT

[75] Inventor: James D. Broadbent, Lansdowne, Pa.

[73] Assignee: Broadbent Spray Rentals, Essington, Pa.

[21] Appl. No.: 906,635

[22] Filed: Aug. 7, 1997

[51] Int. Cl.[6] ............................................................ B08B 3/02
[52] U.S. Cl. ........................ 134/168 R; 114/222; 134/172
[58] Field of Search ............................... 134/167 R, 168 R, 134/172; 114/222; 239/750; 451/93

[56] References Cited

U.S. PATENT DOCUMENTS

| | | | |
|---|---|---|---|
| 2,104,062 | 1/1938 | Temple | 114/222 X |
| 2,132,661 | 10/1938 | Temple | 114/222 X |
| 3,088,429 | 5/1963 | De Fine Brandt Johannessen | 114/222 |
| 3,161,900 | 12/1964 | Hornschuch et al. | 15/345 |
| 3,186,132 | 6/1965 | Duncan et al. . | |
| 3,594,849 | 7/1971 | Coshow | 15/321 |
| 3,609,612 | 9/1971 | Tibbling | 114/222 X |
| 3,682,265 | 8/1972 | Hiraoka et al. | 114/222 X |
| 3,777,834 | 12/1973 | Hiraoka et al. | 114/222 X |
| 3,922,991 | 12/1975 | Woods | 114/222 |
| 3,960,229 | 6/1976 | Shio | 114/222 X |
| 3,973,711 | 8/1976 | Perego . | |
| 3,984,944 | 10/1976 | Maasberg et al. | 114/222 X |
| 4,132,279 | 1/1979 | van der Lende et al. | 114/222 X |
| 4,149,345 | 4/1979 | Atsuchi | 114/222 X |
| 4,377,018 | 3/1983 | Cain | 15/322 |
| 4,445,451 | 5/1984 | van den Broek | 114/222 |
| 4,462,328 | 7/1984 | Oram | 114/222 |
| 4,670,062 | 6/1987 | Lester | 134/21 |
| 4,674,949 | 6/1987 | Kroczynski | 114/222 X |
| 4,696,073 | 9/1987 | Urbania | 15/302 |
| 4,703,817 | 11/1987 | Stoner et al. | 114/222 X |
| 4,747,544 | 5/1988 | Kranzle | 239/251 |
| 4,789,037 | 12/1988 | Kneebone | 114/222 X |
| 4,817,653 | 4/1989 | Grajicek et al. | 134/168 R |
| 4,872,920 | 10/1989 | Flynn et al. | 134/21 |
| 4,890,567 | 1/1990 | Caduff | 114/222 |
| 4,926,775 | 5/1990 | Andorsen | 114/222 |
| 4,940,382 | 7/1990 | Castelain et al. | 114/222 X |
| 5,028,004 | 7/1991 | Hammelmann | 134/176 X |
| 5,048,445 | 9/1991 | Lever et al. | 114/222 |
| 5,125,126 | 6/1992 | Bonnant | 15/321 |
| 5,205,174 | 4/1993 | Silverman et al. | 134/167 C X |
| 5,321,869 | 6/1994 | Kaempf | 15/322 |
| 5,469,597 | 11/1995 | Page | 15/321 |
| 5,531,383 | 7/1996 | Pacht | 239/251 |
| 5,561,883 | 10/1996 | Landry et al. | 15/302 |
| 5,577,293 | 11/1996 | Meredith et al. | 15/302 |

*Primary Examiner*—Philip R. Coe
*Attorney, Agent, or Firm*—Ratner & Prestia

[57] ABSTRACT

A remotely controlled pressurized liquid dispensing mobile unit having a pair of magnetic tracks by which the unit is attracted to and moved along a metallic body to which the pressurized liquid is dispensed.

3 Claims, 5 Drawing Sheets

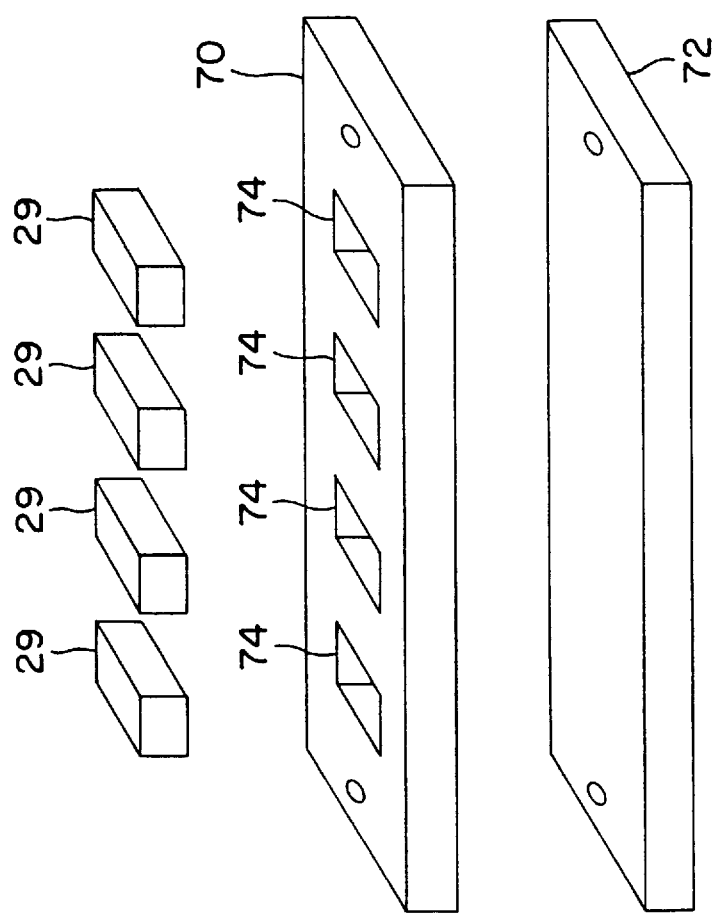

REMOTELY CONTROLLED PRESSURIZED LIQUID DISPENSING MOBILE UNIT

TECHNICAL FIELD

The present invention relates, in general, to the treatment of metallic surfaces and, in particular, to the cleaning of large metallic surfaces by the application of water under very high pressure.

BACKGROUND OF THE INVENTION

There are many large metallic structures, such as the hulls of ships, oil storage tanks, gas holders and buildings, which require maintenance. Such maintenance can include cleaning paint, rust and debris from the surface of the structure.

Among the ways these structures are cleaned is grit blasting. Grit blasting is expensive and exposes the operators of the equipment to health hazards.

Another common practice for cleaning large metallic structures is to apply water under high pressure to the surface being cleaned. There are many remotely controlled pressurized water dispensing mobile units in use today for cleaning large metallic surfaces. Generally, these units suffer from one or more shortcomings. Some are very expensive. Others function at much too slow rates. Probably, the most serious shortcoming of such units is that the pressure of the water being dispensed is limited by the "holding" capability of the mobile unit to the surface of the metallic structure being cleaned. As the water pressure is increased, the back pressure tends to separate the mobile unit from the surface being cleaned. Higher pressures are desired because higher pressures increase the effectiveness of the mobile cleaning unit resulting in greater efficiency and reduced costs.

SUMMARY OF THE INVENTION

A remotely controlled pressurized liquid dispensing mobile unit, constructed in accordance with the present invention, includes a frame having first and second parallel longitudinal sides, first and second gear wheels mounted to the frame at the first longitudinal side of the frame for rotary movement relative to the frame, and third and fourth gear wheels mounted to the frame at the second longitudinal side of the frame for rotary movement relative to frame. A first endless track having a plurality of magnetic sections extends between and around the first and the second gear wheels for movement parallel to the first longitudinal side of the frame as the first and the second gear wheels undergo rotary movement and a second endless track having a plurality of magnetic sections extends between and around the third and the fourth gear wheels for movement parallel to the second longitudinal side of the frame as the third and the fourth gear wheels undergo rotary movement. Also included in this remotely controlled pressurized liquid dispensing mobile unit are first and second power sources mounted to the frame, first gearing means for coupling the first power source to the first and the second gear wheels to impart rotary movement to the first and the second gear wheels, and second gearing means for coupling the second power source to the third and the fourth gear wheels to impart rotary movement to the third and the fourth gear wheels. This remotely controlled pressurized liquid dispensing mobile unit further includes liquid supply means mounted to the frame for supplying liquid under pressure and liquid dispensing means mounted to the frame for dispensing liquid under pressure. First remote control means selectively actuate the first power source to impart rotary movement jointly to the first and the second gear wheels and the second power source to impart rotary movement jointly to the third and the fourth gear wheels. Second remote control means selectively connect the liquid supply means to the liquid dispensing means.

It will be understood that the present invention can be applied for dispensing pressurized water or other liquids for cleaning large metallic surfaces or for dispensing pressurized paint for painting large metallic surfaces.

BRIEF DESCRIPTION OF THE DRAWINGS

FIG. 5 is an exploded perspective view of a component of the FIG. 1 remotely controlled pressurized liquid dispensing mobile unit.

DETAILED DESCRIPTION OF THE INVENTION

Figure 1:
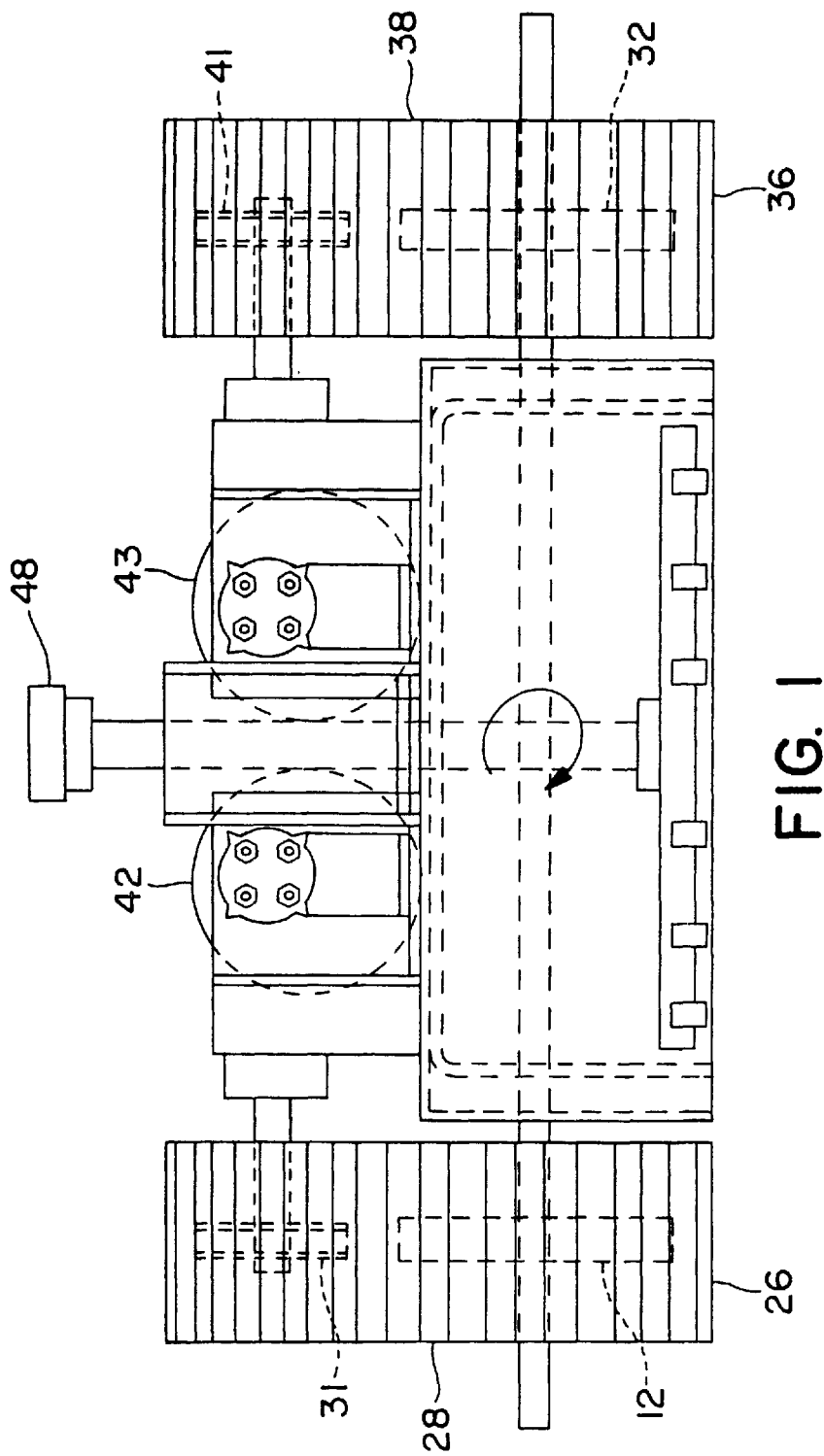
FIG. 1 is a front view of a remotely controlled pressurized liquid dispensing mobile unit constructed in accordance with the present invention.
Figure 2:
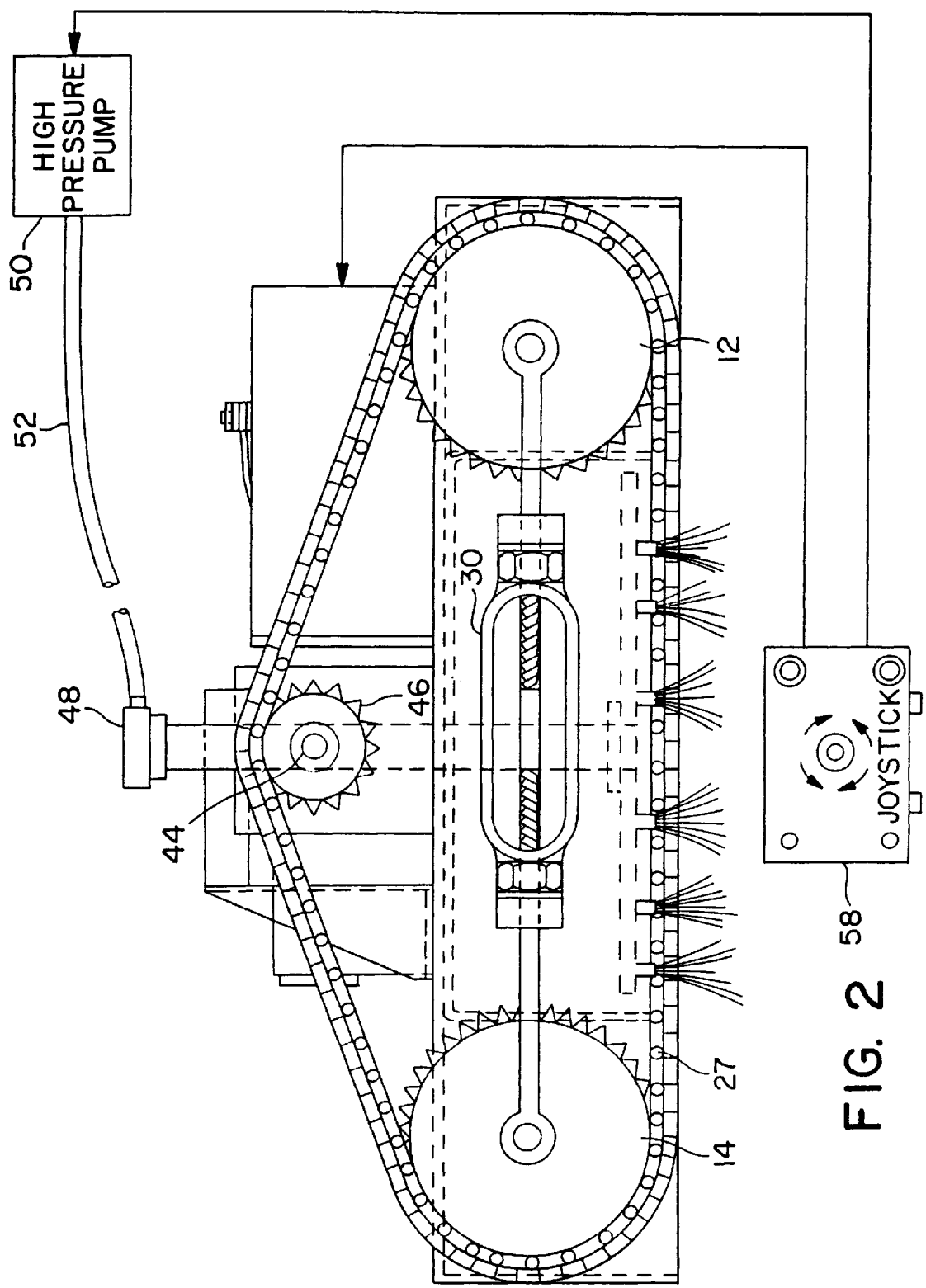
FIG. 2 is a side view of the FIG. 1 remotely controlled pressurized liquid dispensing mobile unit.
Figure 3:
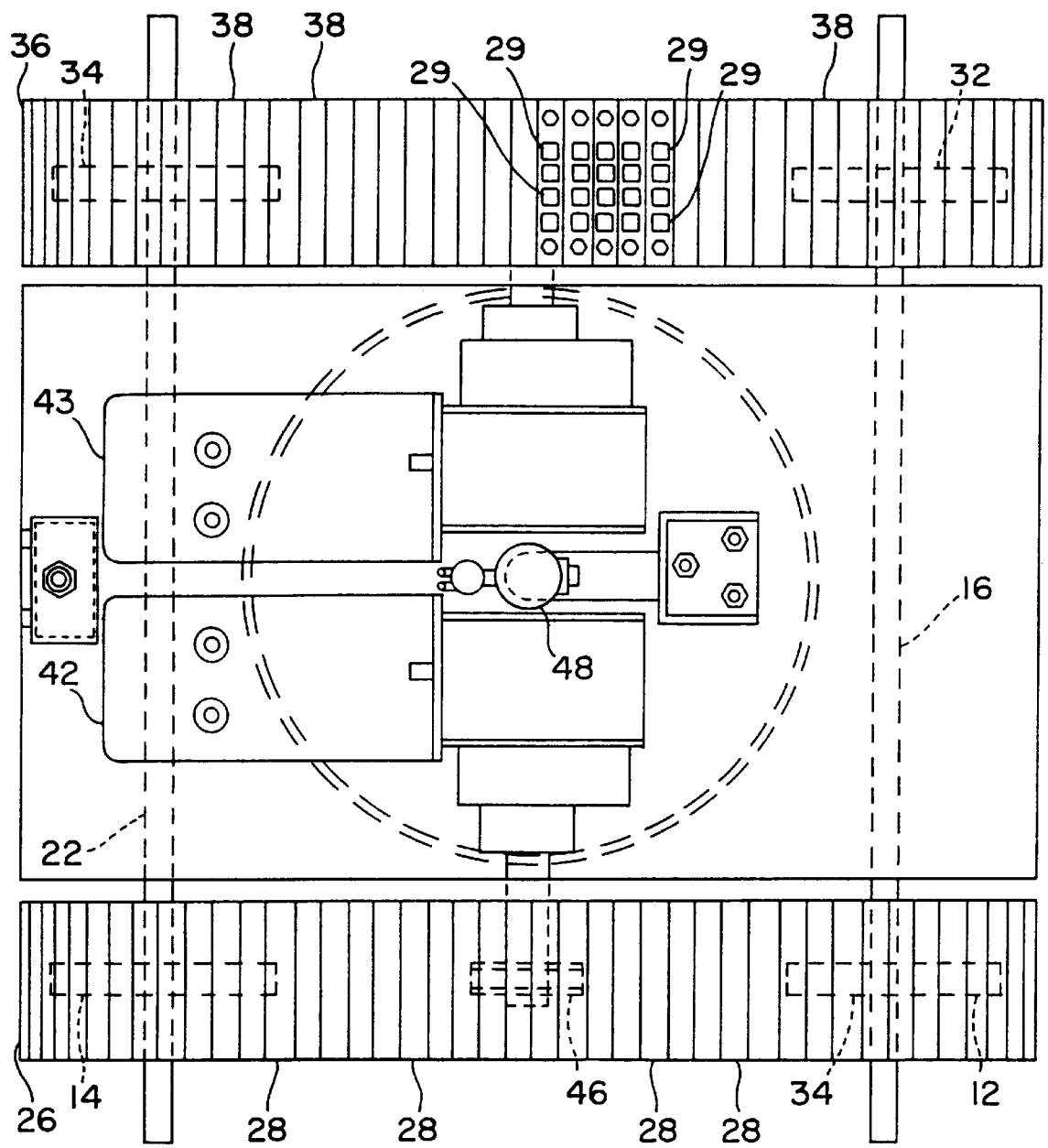
FIG. 3 is a top view of the FIG. 1 remotely controlled pressurized liquid dispensing mobile unit.
Figure 4:
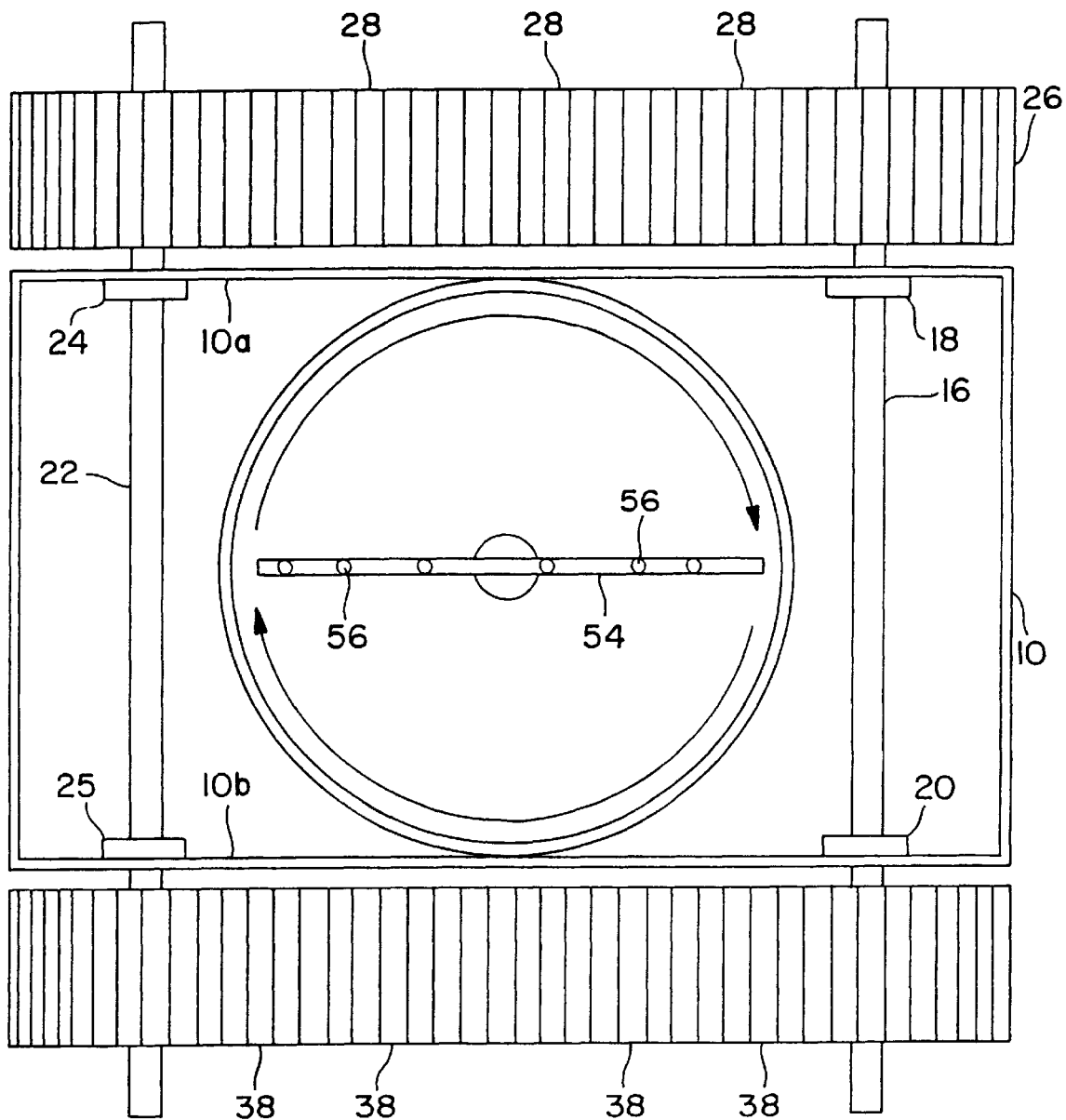
FIG. 4 is a bottom view of the FIG. 1 remotely controlled pressurized liquid dispensing mobile unit.

Referring to FIGS. 1 through 4, a remotely controlled pressurized liquid dispensing mobile unit, constructed in accordance with the present invention, includes a frame 10 having first and second parallel longitudinal sides 10a and 10b, respectively. Frame 10 can be fabricated from a suitable metal and provides support for various components of the remotely controlled pressurized liquid dispensing mobile unit to be described.

A remotely controlled pressurized liquid dispensing mobile unit, constructed in accordance with the present invention, also includes first and second gear wheels 12 and 14, respectively, mounted to frame 10 at first longitudinal side 10a of the frame for rotary movement relative to the frame. First gear wheel 12 is mounted to frame 10 by a first axle 16 which extends through and is fixed to first and second bearings 18 and 20, respectively, fixed to the frame. First gear wheel 12 is free to rotate on first axle 16. For improved rotation of first gear wheel 12, the first gear wheel can be mounted to first axle 16 by an idler bearing (not shown). Second gear wheel 14 is mounted to frame 10 by a second axle 22 which extends through and is fixed to third and fourth bearings 24 and 25, respectively, fixed to the frame. Second gear wheel 14 is free to rotate on second axle 22. For improved rotation of second gear wheel 14, the second gear wheel can be mounted to second axle 22 by an idler bearing (not shown).

A remotely controlled pressurized liquid dispensing mobile unit, constructed in accordance with the present invention, also includes a first endless track 26 having a plurality of magnetic sections 28 extending between and around first gear wheel 12 and second gear wheel 14 for movement parallel to first longitudinal side 10a of frame 10 as the first gear wheel and the second gear wheel undergo rotary movement. First endless track 26 includes a first endless chain 27 which engages first gear wheel 12 and second gear wheel 14 and extends between and around the first and the second gear wheels. Magnetic sections 28 of first endless track 26 are treads extending transverse to the direction of movement of the first endless track and have magnetic segments imbedded in the treads of the first endless track similar to the magnetic segments 29 in a second endless track 36 shown in FIG. 3. For the embodiment of the invention being described, each tread has four rare earth magnetic segments 29 with the magnetic segments in adjacent treads disposed in opposing polarities. Such an arrangement results in increased magnetic effect. A first turnbuckle 30 serves to properly tension first endless track 26.

A remotely controlled pressurized liquid dispensing mobile unit, constructed in accordance with the present invention, also includes third and fourth gear wheels 32 and 34, respectively, mounted to frame 10 at second longitudinal side 10*b* of the frame for rotary movement relative to the frame. Third gear wheel 32 is mounted to frame 10 by first axle 16. Third gear wheel 12 is free to rotate on first axle 16. For improved rotation of third gear wheel 12, the third gear wheel can be mounted to first axle 16 by an idler bearing (not shown). Fourth gear wheel 34 is mounted to frame 10 by a second axle 22. Fourth gear wheel 34 is free to rotate on second axle 22. For improved rotation of fourth gear wheel 34, the fourth gear wheel can be mounted to second axle 22 by an idler bearing (not shown).

A remotely controlled pressurized liquid dispensing mobile unit, constructed in accordance with the present invention, also includes a second endless track 36 having a plurality of magnetic sections 38 extending between and around third gear wheel 32 and fourth gear wheel 34 for movement parallel to second longitudinal side 10*b* of frame 10 as the third gear wheel and the fourth gear wheels undergo rotary movement. As with first endless track 26, second endless track 36 includes a second endless chain (not shown) engaging third gear wheel 32 and fourth gear wheel 34 and extending between and around the third and the fourth gear wheels. Magnetic sections 38 of second endless track 36 are treads extending transverse to the direction of movement of the second endless track and have magnetic segments 29 imbedded in the treads of the second endless track. As with first endless track 26, a second turnbuckle (not shown) serves to properly tension second 36 endless track 26.

A remotely controlled pressurized liquid dispensing mobile unit, constructed in accordance with the present invention, further includes a first power source 42 and a second power source 43 both mounted to frame 10. Power sources 42 and 43 preferably are electric motors.

A remotely controlled pressurized liquid dispensing mobile unit, constructed in accordance with the present invention, further includes first gearing means for coupling first power source 42 to first gear wheel 12 and second gear wheel 14 to impart rotary movement to the first and the second gear wheels. The first gearing means can be a gear box of conventional design and operation having an output shaft 44 on which is mounted a gear 46 which is engaged by first chain 27 of first endless track 26. As gear 46 rotates, first gear wheel 12 and second gear wheel 14, also engaged by chain 27, rotate.

A remotely controlled pressurized liquid dispensing mobile unit, constructed in accordance with the present invention, further includes second gearing means for coupling second power source 43 to third gear wheel 32 and fourth gear wheel 34 to impart rotary movement to the third and the fourth gear wheels. As with the first gearing means, the second gearing means can be a gear box of conventional design and operation and include a gear similar to gear 46 which is engaged by the chain of the second endless track 36 to couple second power source 43 to third gear wheel 32 and fourth gear wheel 34 to impart rotary movement to the third and the fourth gear wheels.

A remotely controlled pressurized liquid dispensing mobile unit, constructed in accordance with the present invention, further includes liquid supply means mounted to frame 10 for supplying liquid under pressure. For the embodiment of the invention being described, a high pressure swivel 48 is connected to a remotely located high pressure pump 50 by a hose 52 to receive liquid under high pressure from the high pressure pump.

A remotely controlled pressurized liquid dispensing mobile unit, constructed in accordance with the present invention, further includes liquid dispensing means mounted to frame 10 for dispensing liquid under pressure. As shown most clearly in FIG. 4, the liquid dispensing means, for the embodiment of the invention being described, include a spray bar 54 having a plurality of nozzles 56 through which liquid, supplied from high pressure swivel 48 under high pressure, is dispensed. Spray bar 54 is mounted for rotary movement by suitable means.

A remotely controlled pressurized liquid dispensing mobile unit, constructed in accordance with the present invention, further includes first remote control means for selectively actuating first power source 42 and second power source 43 impart rotary movement jointly to first gear wheel 12 and second gear wheel 14 and to impart rotary movement jointly to third gear wheel 32 and fourth gear wheel 34. In particular, the first control means can be a joy stick 58 of conventional construction and operation which transmits signals to a control panel which causes the first power source 42 and the second power source 43 to be actuated. For example, when joy stick 58 is pushed forward, both first power source 42 and second power source 43 are actuated to cause first gear wheel 12 and second gear wheel 14 to rotate in a first direction and third gear wheel 32 and fourth gear wheel 34 to rotate in the same direction with the result that the mobile unit moves forward. The mobile unit will move backwards when joystick 58 is pulled backwards. When joystick 58 is pushed to one side, only one of the power sources is actuated to impart rotary movement to the associated gear wheels with result that the mobile vehicle will turn in a first direction and when joystick 58 is pushed to the other side, only the other power source will be actuated to impart rotary movement to the associated gear wheels with result that the mobile vehicle will turn in a second direction opposite to the first direction.

A remotely controlled pressurized liquid dispensing mobile unit, constructed in accordance with the present invention, further includes second remote control means for selectively connecting the liquid supply means, namely liquid under pressure from high pressure pump 50 through hose 52 to high pressure swivel 48 to the liquid dispensing means, namely spray bar 54. For the embodiment of the invention being described, such second control means include a connection between joystick 58 and high pressure pump 50 by which a signal, generated, for example, by the closing of a switch on the joystick is transmitted to the high pressure pump to cause the deliver of high pressure liquid from the high pressure pump through hose 52 to high pressure swivel 48.

FIG. 5 shows a preferred construction of the treads of endless tracks 26 and 36. Each tread is composed of a frame portion 70 and a body portion 72. Magnetic segments 29 are received in openings 74 in frame portion 70. Openings 74 and magnetic segments 29 are sized so that the openings are smaller than the magnetic segments. Magnetic segments 29 are forced into openings 74 under very high forces so that the magnetic segments are held firmly in place in frame portion 70. Next, frame portion 70 is attached to body portion 72 by suitable means, such as two screws, to form the tread.

While in the foregoing there have been described preferred embodiments of the present invention, it should be understood by those skilled in the art that various modifications and changes can be made without departing from the true spirit and scope of the present invention.

What is claimed:

1. A remotely controlled pressurized liquid dispensing mobile unit comprising:

a frame having first and second parallel longitudinal sides;

first and second gear wheels mounted to said frame at said first longitudinal side of said frame for rotary movement relative to said frame;

a first endless track having a plurality of magnetic sections extending between and around said first and said second gear wheels for movement parallel to said first longitudinal side of said frame as said first and said second gear wheels undergo rotary movement;

third and fourth gear wheels mounted to said frame at said second longitudinal side of said frame for rotary movement relative to said frame;

a second endless track having a plurality of magnetic sections extending between and around said third and said fourth gear wheels for movement parallel to said second longitudinal side of said frame as said third and said fourth gear wheels undergo rotary movement;

a first power source mounted to said frame;

a second power source mounted to said frame;

first gearing means for coupling said first power source to said first and said second gear wheels to impart rotary movement to said first and said second gear wheels;

second gearing means for coupling said second power source to said third and said fourth gear wheels to impart rotary movement to said third and said fourth gear wheels;

liquid supply means mounted to said frame for supplying liquid under pressure;

liquid dispensing means mounted to said frame for dispensing liquid under pressure;

first remote control means for selectively actuating:
   (a) said first power source to impart rotary movement jointly to said first and said second gear wheels, and
   (b) said second power source to impart rotary movement jointly to said third and said fourth gear wheels; and second remote control means for selectively connecting said liquid supply means to said liquid dispensing means.

2. A remotely controlled pressurized liquid dispensing mobile unit according to claim 1 wherein:
   (a) said first endless track includes a first endless chain engaging said first and said second gear wheels and extending between and around said first and said second gear wheels,
   (b) said magnetic sections of said first endless track are treads extending transverse to the direction of movement of said first endless track and have magnetic segments imbedded in said treads of said first endless track,
   (c) said second endless track includes a second endless chain engaging said third and said fourth gear wheels and extending between and around said third and said fourth gear wheels, and
   (d) said magnetic sections of said second endless track are treads extending transverse to the direction of movement of said second endless track and have magnetic segments imbedded in said treads of said second endless track.

3. A remotely controlled pressurized liquid dispensing mobile unit according to claim 2 wherein:
   (a) said first and said third gear wheels are mounted to said frame by a first axle about which said first and said third gear wheels rotate, and
   (b) said second and said fourth gear wheels are mounted to said frame by a second axle about which said second and said fourth gear wheels rotate.

\* \* \* \* \*